US008144821B2

(12) United States Patent
Hutchison, IV et al.

(10) Patent No.: US 8,144,821 B2
(45) Date of Patent: Mar. 27, 2012

(54) CDMA FREQUENCY ACQUISITION USING A SIMPLIFIED CRYSTAL OSCILLATOR THAT IS NOT TEMPERATURE COMPENSATED

(75) Inventors: James A. Hutchison, IV, San Diego, CA (US); Ling Hang, San Diego, CA (US); Robbin D. Hughes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 11/327,826

(22) Filed: Jan. 5, 2006

(65) Prior Publication Data
US 2007/0030887 A1  Feb. 8, 2007

Related U.S. Application Data

(60) Provisional application No. 60/665,617, filed on Mar. 24, 2005.

(51) Int. Cl.
*H04B 1/00* (2006.01)
(52) U.S. Cl. ........ 375/344; 375/130; 375/149; 455/255; 455/515; 455/75
(58) Field of Classification Search .................. 375/149, 375/130, 344; 370/335, 342; 455/255, 256, 455/257, 258, 265, 515, 75; 331/18, 176
See application file for complete search history.

(56) References Cited

U.S. PATENT DOCUMENTS

| | | | |
|---|---|---|---|
| 5,790,589 A * | 8/1998 | Hutchison et al. | ............ 375/149 |
| 5,940,027 A * | 8/1999 | Forseth et al. | ........... 342/357.62 |
| 6,134,260 A | 10/2000 | Bottomley et al. | |
| 6,343,070 B1 * | 1/2002 | Klas et al. | ..................... 370/329 |
| 6,445,908 B1 * | 9/2002 | Glazko | ......................... 455/255 |
| 6,873,612 B1 * | 3/2005 | Steer et al. | ..................... 370/342 |
| 6,912,244 B2 | 6/2005 | Challa et al. | |
| 6,963,588 B1 * | 11/2005 | Lynch et al. | .................. 370/516 |

(Continued)

FOREIGN PATENT DOCUMENTS

EP  0893702  1/1999

(Continued)

OTHER PUBLICATIONS

International Search Report—PCT/US06/010955, International Search Authority—European Patent Office—Jul. 31, 2008.

(Continued)

*Primary Examiner* — Aristocratis Fotakis
(74) *Attorney, Agent, or Firm* — Nicholas A. Cole (57) ABSTRACT

CDMA code channels are acquired using a crystal oscillator that is not temperature compensated and that generates a tuning signal with relatively large frequency error (e.g., +/−5 ppm). Channel acquisition is first attempted at no offset from a start frequency that is obtained by fitting an ideal temperature/frequency error curve to available actual data points. Following unsuccessful pilot acquisition, the offset frequency is stepped in a "spiral" manner, and pilot acquisition is retried. When the pilot and synchronization channels are successfully acquired, but the system identification is unexpected, an adjacent channel image has been acquired, and the offset frequency is bumped by a large step (e.g., 15 kHz). Pilot acquisition is retried using spiral stepping. The crystal oscillator is calibrated after each successful acquisition of the pilot, synchronization and paging channels by retaining a data point in a frequency adjustment table for the temperature at which frequency acquisition was successful.

20 Claims, 6 Drawing Sheets

U.S. PATENT DOCUMENTS

| | | | |
|---|---|---|---|
| 7,336,732 B1* | 2/2008 | Wiss | 375/326 |
| 7,375,681 B1* | 5/2008 | Woo | 342/357.62 |
| 2001/0043641 A1* | 11/2001 | Harms et al. | 375/130 |
| 2002/0123316 A1* | 9/2002 | Sih et al. | 455/245.1 |
| 2003/0072331 A1* | 4/2003 | Jou | 370/503 |
| 2003/0134637 A1* | 7/2003 | Cooper | 455/432 |
| 2003/0176204 A1* | 9/2003 | Abraham | 455/556.1 |
| 2006/0029017 A1* | 2/2006 | Mudulodu et al. | 370/328 |

FOREIGN PATENT DOCUMENTS

| | | |
|---|---|---|
| EP | 08930702 A1 | 1/1999 |
| JP | 06242208 | 9/1994 |
| JP | 2001358663 | 12/2001 |
| WO | WO99/31816 | 6/1999 |
| WO | WO99/44306 | 9/1999 |

OTHER PUBLICATIONS

Written Opinion—PCT/US06/010955, International Search Authority—European Patent Office—Jul. 31, 2008.

* cited by examiner

CDMA FREQUENCY ACQUISITION USING A SIMPLIFIED CRYSTAL OSCILLATOR THAT IS NOT TEMPERATURE COMPENSATED

The present Application for Patent claims priority to Provisional Application No. 60/665,617 entitled "CDMA FREQUENCY ACQUISITION. USING A CRYSTAL OSCILLATOR THAT IS NOT TEMPERATURE COMPENSATED" filed Mar. 24, 2005, and assigned to the assignee hereof and hereby expressly incorporated by reference herein.

BACKGROUND

1. Field

The present disclosure relates generally to wireless communication devices and, more specifically, to methods for frequency acquisition for a forward CDMA channel when the starting frequency is relatively inaccurate.

2. Background

Many wireless networks and mobile stations (wireless handsets) are designed to support one or more of the technical standards based on Code Division Multiple Accessing (CDMA), such as (1) the IS-95 standard promulgated by the Telecommunications Industry Association/Electronic Industry Association, (2) the related 1xEV-DO standard, (3) the UMTS standards offered by a consortium named "$3^{rd}$ Generation Partnership Project" (3GPP) and (4) the standard offered by a consortium named "$3^{rd}$ Generation Partnership Project 2" (3GPP2) (the IS-2000 standard). Within such CDMA cellular systems, signals transmitted from a base station to multiple mobile stations are differentiated from one another by unique codes rather than simply by a frequency or time assignment, as in frequency-division multiple accessing (FDMA) or time-division multiple accessing (TDMA). All of the mobile on a single channel in a cellular system use the same wideband carrier frequency. On the forward CDMA channel (also called the downlink channel) from the base station to the mobile station, the base station simultaneously transmits user data to multiple mobile stations in a cell/sector using different codes for transmissions directed to each mobile station. In a direct-sequence CDMA system, the transmitted signals are spread over a frequency band greater than the minimum bandwidth necessary to transmit the data by modulating a carrier signal by the data signal and then modulating the resulting signal again with a wideband spreading signal. Each mobile station acquires the appropriate wideband coded signal for a particular cell/sector through a process of acquiring various code channels that occupy the entire wideband radio channel.

In order to acquire a wideband code channel centered on a predetermined center frequency, the mobile station uses an oscillator to generate a tuning signal to mix-down with, or down-sample, the wideband coded signal. A code channel cannot be successfully acquired if the frequency error is too large relative to the bandwidth of the demodulator. For example, acquiring a code channel with a tuning signal having a relatively large frequency error, such as greater than +/−5 ppm (parts per million), can be difficult. Therefore, CDMA mobile stations typically use voltage-controlled, temperature-compensated crystal oscillators (VCTCXOs) to generate tuning signals having a relatively small frequency error, such as less than +/−2 ppm. Alternatively, a crystal oscillator without the additional circuitry to compensate for the influence of temperature on the output frequency is relatively less expensive to manufacture than a VCTCXO. The frequency error of a crystal oscillator, however, can be relatively large, such as +/−20 ppm. It would be advantageous for a mobile station to perform channel acquisition using such a relatively less expensive crystal oscillator. Thus, a method is sought for acquiring CDMA code channels using a tuning signal having a relatively larger frequency error, such as greater than +/−5 ppm.

SUMMARY

Circuitry in a mobile station acquires CDMA code channels using a crystal oscillator with a relatively large frequency error, for example greater than +/−5 ppm. The frequency of the signal output by the crystal oscillator is not temperature compensated. Channel acquisition is first attempted at a center frequency equaling a start frequency. The start frequency is obtained from an ideal curve that is fitted to any available temperature/frequency error data points from a frequency adjustment table. Following unsuccessful pilot channel acquisition, the mobile station steps an offset in frequency in a "spiral" manner. Pilot acquisition is then retried at center frequencies equaling the start frequency plus offset frequencies having magnitudes that are multiples of a "spiral" sequence: 0, +1, −1, +2, −2, +3, −3, .... This iterative "spiral" searching method is repeated with increasingly divergent alternating higher and lower frequencies until either the pilot channel is acquired or a predetermined maximum number of iterations has occurred. The center frequency is adjusted using both a phase-locked loop and a frequency rotator. In one embodiment, coarse tuning is performed using the phase-locked loop, and fine tuning is performed with the frequency rotator. A processor adjusts the frequency of the tuning signal output by the phase-locked loop, conditioning the signal output by the crystal oscillator. The crystal oscillator signal is used as the reference clock signal for the phase-locked loop. The processor also controls the amount by which the frequency rotator adjusts the center frequency of the code channels that are to be acquired.

When the pilot and synchronization channels are successfully acquired, but the circuitry detects an unexpected system identification (e.g., SID), an adjacent channel image has likely been acquired. If the system identification is acceptable, or is an inconclusive indication, and the synchronization channel directs the mobile station to a new channel that cannot be demodulated, an adjacent channel image has likely been acquired. In either case where an image is suspected, the offset frequency is "bumped" from the current value, in a spiral fashion, by a large step, for example by more than fifteen kHz. Pilot acquisition is retried using the "bumped" offset frequency, and then spiral stepping is performed until pilot acquisition is successful. When the circuitry detects multiple likely adjacent channel images, successively following successful pilot and synchronization channel acquisition, the circuitry "bumps" the offset frequency in a spiraling manner, and pilot acquisition is retried. After acquisition of all of the three pilot, synchronization and paging channels, the circuitry calibrates the crystal oscillator by updating the frequency adjustment table with a data point for the temperature at which frequency acquisition was successful. Thus, the crystal oscillator is repeatedly calibrated as the mobile station is used. For implementations without non-volatile storage, the storage step can be omitted, with some loss of efficiency.

A method of channel acquisition in a CDMA cellular system involves reading data points from a temperature adjustment table, fitting an ideal curve to the data points, if any, estimating the temperature of a crystal oscillator, and setting the start frequency for channel acquisition. The method attempts to acquire a pilot channel at the start frequency plus an offset frequency initially set to zero. If it is determined that the pilot channel has not been acquired, the offset frequency is set to a first offset. Pilot channel acquisition is then attempted at the start frequency plus the first offset. If it is determined that the pilot channel has not been acquired at the start frequency plus the first offset, the offset frequency is stepped in a spiraling manner. Pilot acquisition is then successively retried at the start frequency plus an offset frequency that is a multiple of the spiral sequence: 0, +1, −1, +2, −2, +3, −3, . . . .

If it is determined that the pilot channel has been acquired, synchronization channel acquisition is attempted at the frequency at which pilot channel acquisition was successful. If synchronization channel acquisition is not successful, pilot channel acquisition is then re-attempted at that same center frequency, and the method returns to the pilot channel acquisition steps. The re-attempts compensate for potential short-term poor channel conditions. If it is determined that the synchronization channel has been acquired, it is then determined whether the expected system identification (e.g., SID) is detected. The expected system identification indicates the expected CDMA cellular system. If the system identification is as expected, paging channel acquisition is attempted at the frequency at which synchronization channel acquisition was successful. Upon successful acquisition of the pilot, synchronization and paging channels, the actual frequency error of the crystal oscillator at a given temperature has been determined. The frequency adjustment table is updated for this temperature and frequency.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
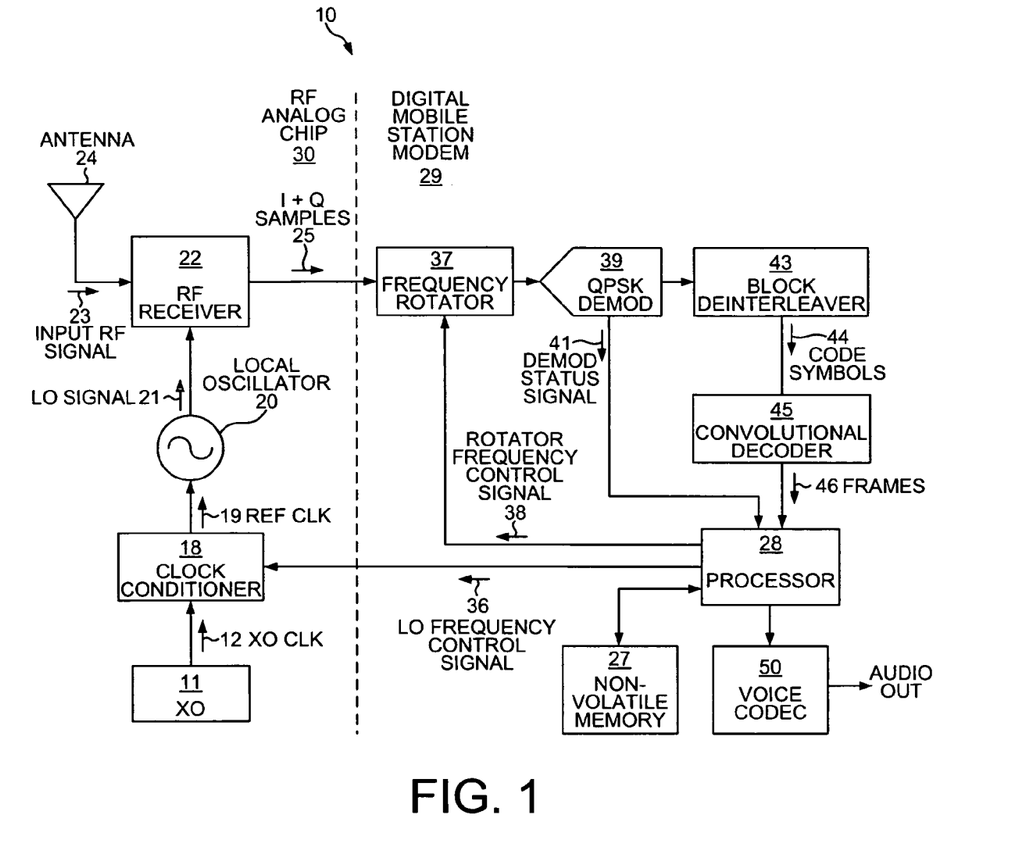
FIG. 1 is a simplified schematic block diagram of circuitry that acquires CDMA code channels using a crystal oscillator.

FIG. 1 is a simplified block diagram of circuitry 10 that acquires CDMA code channels using a crystal oscillator 11 in the generation of the tuning signal. Crystal oscillator 11 outputs a crystal oscillator clock signal (XO CLK) 12, whose frequency varies with temperature variation. In one embodiment, crystal oscillator 11 is a 19.2 MHz crystal oscillator. Crystal oscillator 11 can be manufactured less expensively than can a VCTCXO that includes circuitry to compensate for the influence of temperature on the output frequency. Consequently, it is less expensive to manufacture a cell phone (also called a mobile station) that contains a crystal oscillator as opposed to a VCTCXO. In this example, the frequency error ($\Delta f/f$) of crystal oscillator 11 is about +/−9 ppm. GSM mobile stations typically use only a crystal oscillator to generate tuning signals. Using a crystal oscillator for CDMA signal acquisition has the added advantage of enabling tuning signals to be generated with the same oscillator in single-chip GSM/CDMA solutions.

Figure 2:
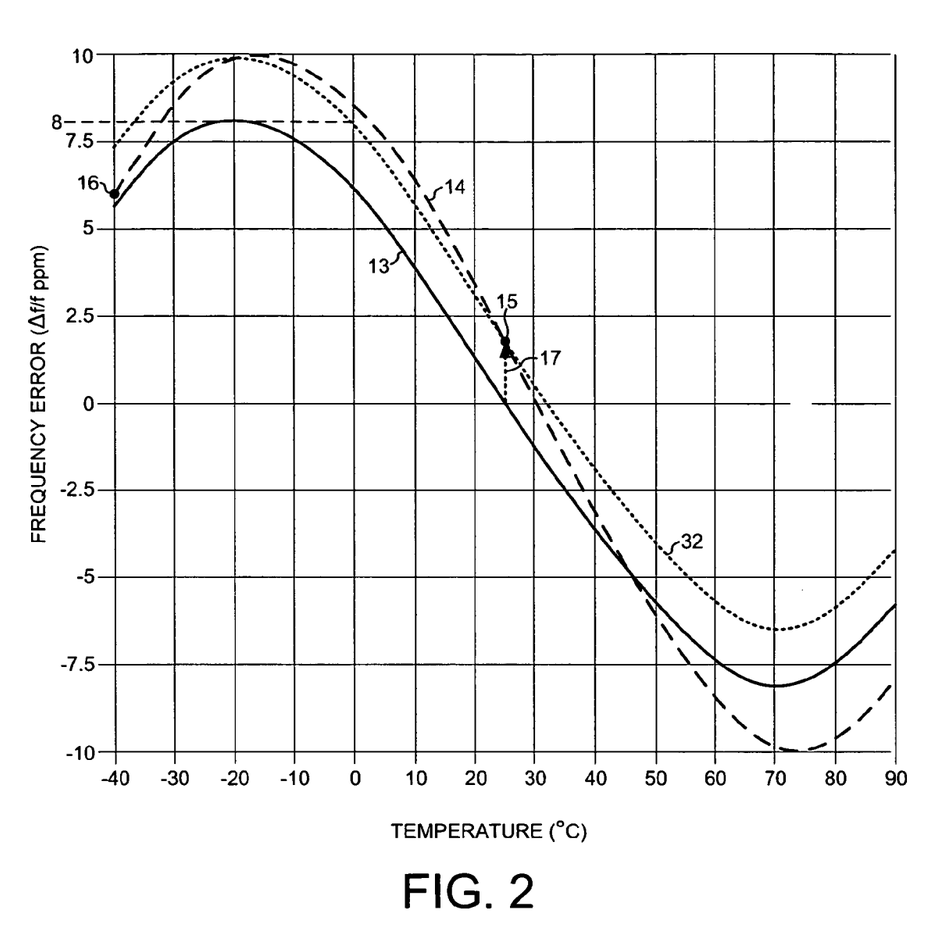
FIG. 2 is a graph of frequency error versus temperature for the crystal oscillator of FIG. 1.

FIG. 2 shows a graph of the relationship between frequency error and temperature of crystal oscillator 11. In this embodiment, crystal oscillator 11 contains a quartz crystal. A solid curve 13 represents the ideal curve for quartz crystals cut similar to crystal oscillator 11. The baseline output frequency is measured at about 25° C. In this example, the output frequency of an ideal crystal similar to crystal oscillator 11 increases to about +8 ppm at about −20° C. and decreases to about −8 ppm at about 70° C. A dashed curve 14 represents the actual relationship between frequency error and temperature of XO CLK 12 output by crystal oscillator 11. The actual frequency error over temperature is determined by fitting the ideal curve to data points obtained through calibration. The calibration is typically performed in the factory. For example, data points 15 and 16 are measured at 25° C. and −40° C., respectively, and then ideal curve 13 is shifted by an amount 17 and fitted to point 16 to obtain the actual frequency error curve. In this example, crystal oscillator 11 actually exhibits a frequency error ($\Delta f/f$) due to temperature variation of +/−10 ppm. The actual frequency error of crystal oscillator 11 may total to twice the frequency error caused by temperature variation. The remaining frequency error varies on a part-to-part basis due to manufacturing process variations. In this example, the actual frequency error at 0° C. is about 2.5 ppm greater than the ideal curve indicates. Circuitry 10 allows the actual frequency error to be determined as successive code channels are acquired and thereby reduces the amount of calibration that must be performed in the factory. Reducing the amount of calibration performed in the factory reduces the cost of manufacturing the mobile station that contains circuitry 10.

Returning to FIG. 1, XO CLK 12 is conditioned by a clock conditioner 18 and is used as a reference clock (REF CLK) 19 for a local oscillator 20. Local oscillator 20 generates a local oscillator (LO) signal 21 that is used as a tuning signal. In this embodiment, local oscillator 20 is a sigma-delta, Frac-N phase-locked loop (PLL). In other embodiments, local oscillator 20 is a Direct Digital Synthesizer (DDS). LO signal 21 is mixed in an RF receiver 22 with an input RF signal 23 that is received from an antenna 24. Before acquiring a forward traffic channel, the mobile station that contains circuitry 10 first acquires timing and code information from a pilot channel, a synchronization channel and a paging channel. For individuals relatively skilled in the art, pilots can either be code-division pilots, time-division pilots, or a combination, such as found in 1xEV-DO an UMTS. Likewise, synchronization and system overhead (paging) information in various formats can be used as synchronization and system overhead (paging) information.

The process of channel acquisition depends on the ability of the mobile station to generate the tuning signal with a sufficiently accurate frequency to mix with the RF carrier and produce a decipherable code channel. It typically becomes difficult to acquire a code channel when the center frequency of the downconverted band differs by more than +/−2 ppm from the correct center frequency of the desired code channel. A crystal oscillator with a frequency error of more than +/−2 ppm can nevertheless be used to generate a tuning signal with sufficient accuracy to acquire code channels if an appropriate method is used to compensate for the frequency error of the crystal oscillator. On the other hand, a mobile station that uses crystal oscillator 11 without the remaining circuitry 10 and that is not factory calibrated would have difficulty acquiring code channels on a cold day, in this example. At 0° C., the frequency of the tuning signal would be more than 2 ppm faster than the ideal curve 13 indicates, as shown in FIG. 2. When LO signal 21 has the correct center frequency, RF receiver 22 outputs digital I and Q samples (in-phase and quadrature samples) 25 from which code channels can be acquired.

Figure 3:
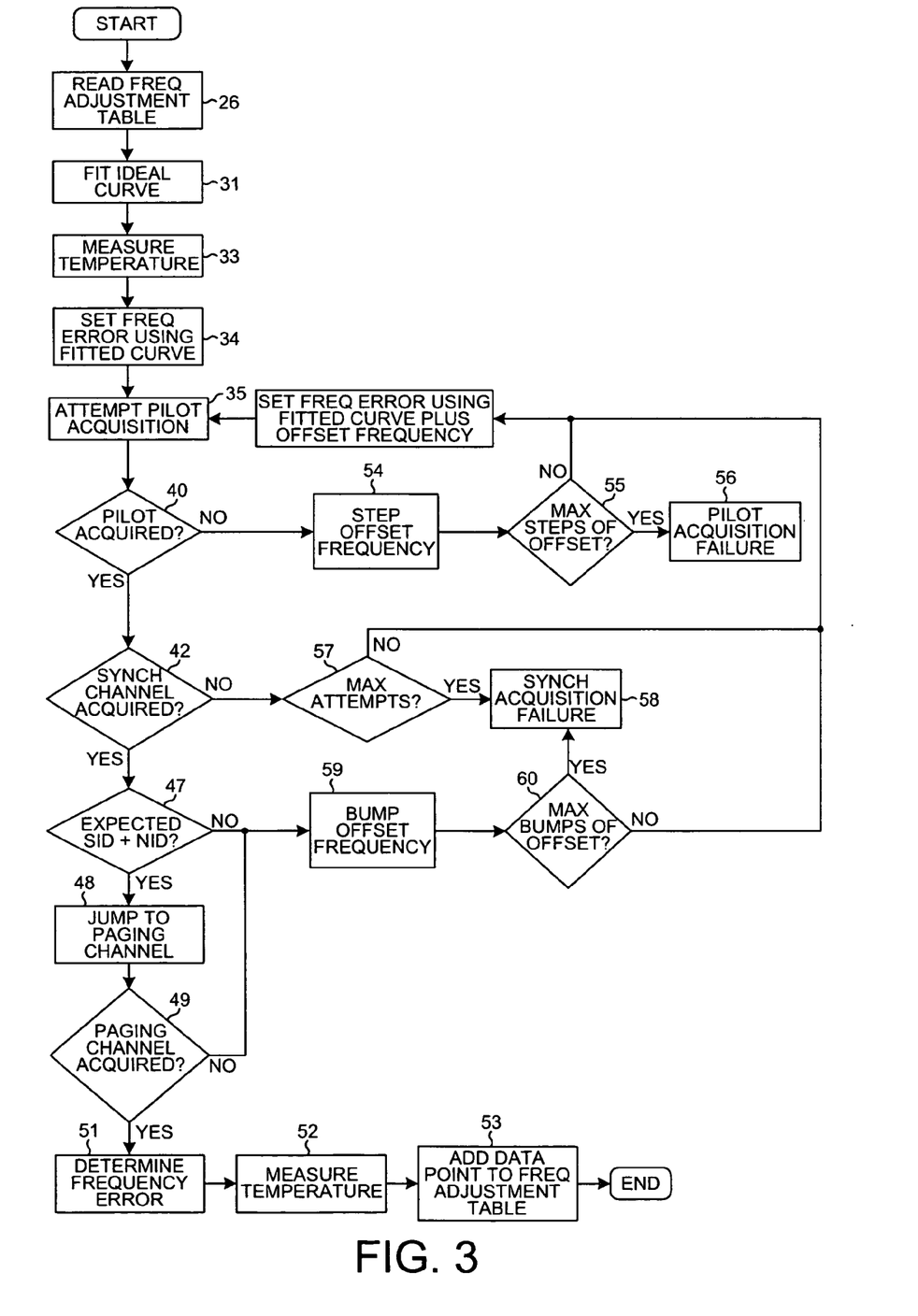
FIG. 3 is a flowchart of steps for acquiring CDMA code channels using the crystal oscillator of FIG. 1.

FIG. 3 is a flowchart that illustrates a method for acquiring CDMA code channels using a crystal oscillator that exhibits a relatively large frequency error, for example greater than +/−5 ppm. The method illustrated in FIG. 3 is performed by the circuitry 10 of FIG. 1 and does not require factory calibration to obtain the actual frequency error curve 14 for crystal oscillator 11. In the initial four steps of the method, the ideal curve is fitted to available data points, if any, to obtain a current frequency error value. Circuitry 10 uses the current frequency error value to generate LO signal 21 with a frequency that results in code channels having a center frequency with an error of less than +/−5 ppm. Subsequent steps then produce code channels having a center frequency with a relatively small frequency error, for example less than +/−5 ppm.

In an initial step 26, a frequency adjustment table is read from non-volatile memory 27 by a processor 28. Non-volatile memory 27 and processor 28 are included in a digital mobile station modem 29 of circuitry 10. On the other hand, crystal oscillator 11, clock conditioner 18, local oscillator 20 and RF receiver 22 are included in an RF analog chip 30 of circuitry 10. After step 26, the frequency adjustment table contains points along ideal curve 13 of FIG. 2. In a step 31, ideal curve 13 is fitted to any available data points. In this example, only data point 15 is available. Thus, following step 31, circuitry 10 will reference a fitted curve 32, as shown in FIG. 2. In a step 33, circuitry 10 acquires a temperature measurement that approximates the temperature of crystal oscillator 11. Then a current frequency error value is determined in a step 34 by mapping the measured temperature along the fitted curve 32. For example, for a measured temperature of 0° C., the current frequency error value is determined to be about +8 ppm.

In a step 35, circuitry 10 attempts to acquire a pilot code channel at a start frequency obtained using the current frequency error value. There are two mechanisms by which circuitry 10 shifts the center frequency of the code channels based on the current frequency error value. The first mechanism adjusts LO signal 21, and the second mechanism directly adjusts the frequency of the signals output by RF receiver 22 after input RF signal 23 is downconverted.

Figure 4:
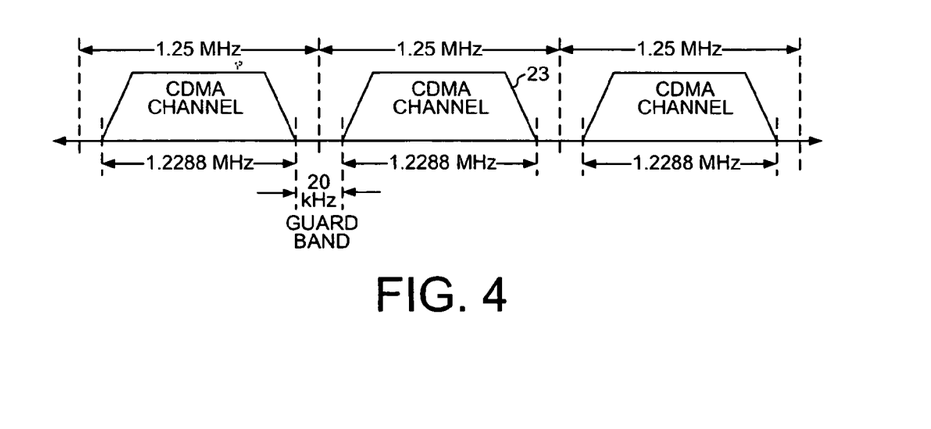
FIG. 4 is a diagram showing the frequency spacing of adjacent CDMA communication channels.

FIG. 4 shows the frequency spacing of three adjacent one-way CDMA communication channels. In this example, the center channel represents wideband input RF signal 23. Wideband input RF signal 23 is the forward CDMA communication channel used to transmit data from the base station to multiple mobile stations, including the mobile station that contains circuitry 10. The base station simultaneously transmits user data for all current mobile stations in the associated cell via input RF signal 23 by transmitting code channels using different spreading sequence codes. The code channels are logical channels as apposed to frequency channels and are transmitted on the same RF carrier. In the IS-95 standard, the code channels include a pilot channel, a synchronization channel, up to seven paging channels and a number of forward traffic channels. Each CDMA communication channel is allocated a 1.25-MHz frequency spectrum, of which 1.2288 MHz is used as the radio channel leaving approximately 20 kHz as a guard band between radio channels. All of the code channels share the same frequency spectrum and occupy the entire 1.2288-MHz wideband radio channel.

Returning to the two mechanisms for shifting frequency used in step 35 of FIG. 3, the first mechanism adjusts LO signal 21 by conditioning the XO CLK 12 output by crystal oscillator 11. Processor 28 sends a digital LO frequency control signal 36 to clock conditioner 18. Clock conditioner 18 then outputs REF CLK 19 with a frequency that may be faster or slower than that of XO CLK 12, depending on LO frequency control signal 36. The change in the frequency of REF CLK 19 causes a corresponding change in the frequency of LO signal 21 because REF CLK 19 is the reference clock signal received by the PLL of local oscillator 20. RF receiver 22 uses LO signal 21 to downconvert input RF signal 23, which is then split into the I and Q components 25. A frequency change of LO signal 21 results in a change in the center frequency of the I and Q samples 25. The wideband I and Q samples 25 output by RF receiver 22 contain code channels and have a center frequency that may or may not have been shifted depending on LO frequency control signal 36.

The second mechanism for shifting the center frequency of the code channels involves a frequency rotator 37 that receives the I and Q samples 25 from RF receiver 22. Processor 28 sends a digital rotator frequency control signal 38 to frequency rotator 37. Based on rotator frequency control signal 38, frequency rotator 37 shifts the center frequency of the wideband I and Q samples 25 output by RF receiver 22. Frequency rotator 37 shifts the apparent frequency of the I and Q samples 25 by performing phase rotation. The I and Q samples 25 output by frequency rotator 37 are then received by a quadrature-phase-shift-keying (QPSK) demodulator 39. The center frequency of the I and Q samples 25 received by QPSK demodulator 39 may or may not have been shifted depending on rotator frequency control signal 38. In this embodiment, clock conditioner 18 and local oscillator 20 are used for coarse tuning of the center frequency of the code channels, whereas frequency rotator 37 is used for fine tuning. Local oscillator 20 includes a PLL with a wider dynamic range than that of frequency rotator 37. Manufacturing costs of circuitry 10 are reduced by performing the fine tuning with frequency rotator 37 instead of with a precise PLL that typically would occupy more space on RF analog chip 30 and operate at a higher clock speed than would the less precise PLL of local oscillator 20.

In a decision step 40 of the frequency acquisition method of FIG. 3, circuitry 10 determines whether the pilot code channel has been acquired from the I and Q samples 25. The initial frequency acquisition is performed at a start frequency plus an offset frequency that is set at zero. Determining whether the pilot channel has been acquired involves calculating the cross product of a pseudorandom or pseudo noise (PN) sequence and the I and Q samples 25. Circuitry 10 includes a PN generator comprised of a network of feedback loops, modulo-2 adders and a register of flip-flops. A PN generator with an N-bit register can generate a PN sequence of length $2^N-1$. When a PN sequence having the correct offset matches the PN sequence with which the transmitted data signal was originally spread in the base station, circuitry 10 detects well-correlated energy indicating that the pilot channel has been acquired. QPSK demodulator 39 detects the well-correlated energy and indicates the degree of correlation to processor 28 in a demodulation status signal 41.

Besides correlating the I and Q samples 25 with the PN sequence at a predetermined pilot PN offset, QPSK demodulator 39 also despreads the I and Q samples with the PN sequence and applies an inverse Walsh function. In the IS-95 standard, data to be transmitted from the base station over a code channel is first grouped into 20-ms frames, convolutionally encoded, repeated to adjust the data rate and then interleaved. Each code channel is then orthogonally spread in the base station by one of 64 Walsh functions of length 64. Bits of the spreading Walsh function are called chips. The spreading by the Walsh functions is performed at a fixed chip rate of 1.2288 Mcps (mega chips per second). Because the Walsh functions are mutually orthogonal, the code channels spread by the Walsh functions are also orthogonal. The orthogonal spreading provides orthogonal channelization among all channels to mobile stations within the cell covered by the base station. Consequently, the forward traffic channel to each mobile station is spread by a different Walsh function. Interference is nevertheless present from channels in neighboring cells spread using the same Walsh functions. Moreover, interference is also present because code channels in neighboring cells that are non-synchronously spread even with different Walsh functions are not time-aligned and therefore not orthogonal. Consequently, each code channel is also spread by a quadrature pair of pilot PN sequences. The resulting pair of channels is transmitted from the base station to the mobile station as a pair of quadrature phase-shift keying (QPSK) waveforms. These pair of waveforms are the I and Q samples 25. In one embodiment, the pilot PN binary sequence has a length of $2^{15}$, or 32,768. Thus, each code channel is transmitted as a pair of I and Q signals, each with a period of 32,768 chips. With a chip rate of 1.2288 Mcps, a period of 32,768 chips corresponds to a period of 26.67 ms.

In the IS-95 standard, all base stations in a cellular system use the same PN sequence, but with a different pilot PN offset. The IS-95 standard uses 512 unique time offsets with a spacing of 64 chips between offsets on the 32,768-chip PN sequence. The PN sequence modulation is performed at the same clock rate as the Walsh function modulation. The quadrature pair of PN sequences is an in-phase (I-channel) sequence and a quadrature (Q-channel) sequence. All of the code channels transmitted in a single cell (or in a single sector of a sectorized cell) use the same time offset of the pilot PN sequence. Thus, each base station uses a different time offset to identify its forward CDMA communication channel. A particular pilot PN offset can be reused by non-adjoining cells within a CDMA cellular system.

Each of the pilot channel, the synchronization channel, the paging channels and the forward traffic channels is generated using a different Walsh function. The pilot channel is an unmodulated, direct-sequence spread spectrum signal transmitted at all times by each CDMA base station. The pilot channel is spread with the Walsh code zero ($W_0$). The Walsh code zero is comprised of all zeros. Each mobile station monitors the pilot channel to acquire the timing of the forward CDMA channel. The pilot channel provides a phase reference to the mobile station for coherent demodulation and allows the mobile station to synchronize to a chip clock. A higher power level is given to the pilot channel than to the other code channels to facilitate channel acquisition. The pilot channel is also used for comparison of signal strength between different base stations to decide when to handoff a call to an adjacent base station.

The synchronization channel is an encoded, interleaved, spread and modulated spread spectrum signal. The synchronization channel is spread with the Walsh code number 32 ($W_{32}$). The mobile station uses the synchronization channel to acquire the initial time synchronization. A synchronization channel message is transmitted over the synchronization channel and includes information such as the system time, the offset local time, the pilot short PN sequence offset, the daylight saving time indicator and the data rate of the paging channel.

The paging channel is also an encoded, interleaved, spread and modulated spread spectrum signal. The IS-95 standard defines seven paging channels that are spread with the Walsh code numbers 1-7. A paging channel transmits control information and pages from the base station to the mobile station. When a call is made to a mobile station, the mobile station receives a page from the base station on an assigned paging channel. The primary paging channel is spread with the Walsh code 1 ($W_1$). A mobile station first examines paging channel $W_1$. If paging channel $W_1$ is not appropriate, the mobile station then checks for the correct paging channel using a hashing function.

If the pilot channel is acquired in step 40, then circuitry 10 proceeds to a decision step 42. In step 42, circuitry 10 determines whether the synchronization channel has been acquired. To acquire the synchronization channel, QPSK demodulator 39 applies the inverse of Walsh code number 32 ($W_{32}$) to the I and Q samples 25 that have been despread with the PN sequence beginning at the correct pilot PN offset. The output of QPSK demodulator 39 is then deinterleaved by a block deinterleaver 43 that outputs code symbols 44. A convolutional decoder 45, such as a Viterbi decoder, then decodes the code symbols 44 and outputs frames 46 of the synchronization channel message. Circuitry 10 determines whether the synchronization channel has been acquired based on cyclic redundancy check (CRC) values and on detecting a low incidence of symbol errors. Processor 28 determines whether the frame-level CRC values and the message-level CRC values check. Depending on the protocol, a predetermined number of consecutive frame errors is defined as a loss of the synchronization channel.

In a decision step 47, circuitry 10 determines whether the system identification (for example, a system identification number (SID)) and the network identification number (NID) contained in the synchronization channel message match the values that the mobile station has been programmed to expect. A system includes all of the base stations that make up the CDMA cellular system that uses a particular CDMA communication channel. The network can be a subset of those base stations. For example, a network might be defined as all base stations controlled by a given Centralized Base Station Controller (CBSC). Under IS-683, the mobile station contains system records of system identification numbers that define a preferred roaming list of CDMA cellular systems. System records point to acquisition records that define channels used by the systems. When circuitry 10 attempts to acquire cellular service on a particular channel, processor 28 expects to find the system identification of the system associated with that channel. In this embodiment, processor 28 analyzes frames 46 to determine whether the SID and NID match the expected values.

If the SID and NID are as expected, circuitry 10 attempts to acquire the appropriate paging channel. In a step 48, circuitry 10 adjusts the frequency of LO signal 21 in order to acquire the paging channel. As with the acquisition of the pilot channel and the synchronization channel, both frequency rotator 37 and local oscillator 20 in combination with clock conditioner 18 are used to place the center frequency of the I and Q samples 25 at the correct frequency to acquire the paging channel. In some situations, the paging channel may be located in a different CDMA communication channel, and circuitry 10 jumps to that channel.

In a decision step 49, circuitry 10 determines whether the paging channel has been acquired. Processor 28 checks the CRC values of the messages containing the control information and pages. Processor 28 also checks for symbol errors in the paging channel. If the paging channel is acquired in step 49, then frequency acquisition is complete and the mobile station can receive communications over a forward traffic channel. For voice communications, data from the demodulated, deinterleaved and convolutionally decoded frames is again decoded in a voice coder/decoder (CODEC) 50 to generate an audio output signal. After successful frequency acquisition in step 49, circuitry 10 calibrates crystal oscillator 11 by adding an additional data point to the frequency adjustment table.

In a step 51, circuitry 10 determines the frequency error of crystal oscillator 11 based on the center frequency at which the pilot, synchronization and paging channels were acquired. In a step 52, circuitry 10 again acquires a temperature measurement that approximates the temperature of crystal oscillator 11 immediately after frequency acquisition is complete. Then in a step 53, a data point is added to the frequency adjustment table that corresponds to the frequency error at the measured temperature. For example, where the measured temperature is −40° C. and the frequency error corresponds to +6 ppm, data point 16 of FIG. 2 is added to the frequency adjustment table. When circuitry 10 next performs frequency acquisition, ideal curve 13 will be fitted to two data points 15 and 16, and following step 31, circuitry 10 will reference the fitted curve 14, as shown in FIG. 2. A thorough calibration of crystal oscillator 11 is thereby performed with continued use of the mobile station, reducing the amount of calibration that must be performed in the factory. There is an additional advantage of an ongoing calibration that compensates for frequency errors that change as the mobile station and crystal oscillator 11 age.

Returning to decision step 40, circuitry 10 determines that the pilot channel has not been acquired in this example. The initial attempted acquisition was performed at a first center frequency equaling the start frequency plus an offset frequency. The start frequency was obtained from fitted curve 32, and the offset frequency was set at zero. Now in a step 54, the offset frequency is stepped to a first offset value. In one example, the first offset value is set at 1 kHz. In a step 55, circuitry 10 determines whether the offset frequency has been stepped more than a predetermined number of permissible times. For example, the maximum number of permissible steps may be set at twenty. In that case, if the pilot channel has not been acquired after attempting at the first center frequency and nineteen subsequent center frequencies obtained over nineteen steps of the offset frequency, then further attempts at frequency acquisition cease when the offset frequency is stepped the twentieth time and the maximum number is reached. In that case, a pilot channel acquisition failure is indicated in a step 56.

Where the maximum number of permissible steps has not been reached in step 55, a second center frequency is set. The second center frequency is the start frequency plus the offset frequency, where the offset frequency has now been set at the first offset value. Pilot channel acquisition is repeated in step 35 at the second center frequency. Pilot channel acquisition is again unsuccessful in step 40 in this example. In step 54, the offset frequency is stepped to a second offset value. The second offset value is the opposite of the first offset value. In this example, the first offset value was set at 1 kHz, so the second offset value is set at −1 kHz. Then steps 55, 35 and 40 are repeated. After each successive unsuccessful attempt at pilot channel acquisition, the offset frequency is stepped so as to perform a "spiral search" of the correct center frequency. Thus, frequency acquisition is performed in this example at center frequencies equaling the start frequency plus offset frequencies in the "spiral" sequence: 0, +1, −1, +2, −2, +3, −3, . . . (kHz). In the event that the offset frequency is stepped all the way to −10 kHz, but before pilot channel acquisition is attempted at that offset, a pilot channel acquisition failure would be indicated in step 56.

After the pilot channel has successfully be acquired in step 40, the synchronization channel is not acquired in step 42 in this example. In a step 57, circuitry 10 determines whether more than a predetermined number of permissible attempts have been made to acquire the synchronization channel. Attempts to acquire the synchronization channel are made only after the pilot channel has been acquired, regardless of how many times pilot channel acquisition was attempted with different offset frequencies. Where the maximum number of attempts to acquire the synchronization channel has been made, a synchronization channel acquisition failure is indicated in a step 58. If it is determined in step 57 that the maximum number of attempts to acquire the synchronization channel have not been made, frequency acquisition returns to step 35 using the same offset frequency at which synchronization channel acquisition was last attempted. Pilot channel acquisition in step 40 and synchronization channel acquisition in step 42 are then repeated.

In this example, after pilot channel acquisition and synchronization channel acquisition have been successfully performed, circuitry 10 determines that either the SID or the NID (or both) contained in the synchronization channel message do not match the values preprogrammed in the mobile station. When circuitry 10 detects an unexpected SID or NID, circuitry 10 bumps the offset frequency in a step 59. The offset frequency is bumped by adding a bump offset to the currently used center frequency, which is the start frequency plus the offset frequency last set in step 54. (Before an offset frequency is first set in step 54, an offset frequency of zero is used.) The bump offset is typically greater than fifteen kHz. In this example, a bump offset of 20 kHz is used.

In a step 60, circuitry 10 determines whether the offset frequency has been bumped more than a predetermined number of permissible times. For example, the maximum number of permissible bumps may be set at five. The maximum number of permissible bumps is typically less than the number of permissible steps. Where the maximum number of permissible bumps has been reached, the correct synchronization channel has not been acquired, and further attempts at frequency acquisition cease. In that case, a synchronization channel acquisition failure is indicated in a step 58. If it is determined in step 60 that the maximum number of bumps has not been reached, frequency acquisition returns to step 35 using the same offset frequency (with the bump offset) at which synchronization channel acquisition was last attempted. Pilot channel acquisition in step 40 and synchronization channel acquisition in step 42 are then repeated.

After the pilot channel and the synchronization channel have been acquired and the expected system identification information (such as SID and/or NID) are detected, the paging channel may nevertheless not be acquired in decision step 49. Failure to acquire the paging channel may occur because the demodulation process for the paging channel may be more stringent than for the pilot and synchronization channels. In addition, if an adjacent channel image was acquired on a CDMA communication channel belonging to the same cellular operator, the SID and/or NID may have the expected values, but the correct paging channel will not be present. Circuitry 10 determines that the paging channel has not been acquired by checking the frame-level CRC values and the message-level CRC values of the paging channel. When the paging channel is not acquired in step 49, circuitry 10 returns to step 59 and bumps the offset frequency.

Figure 5:
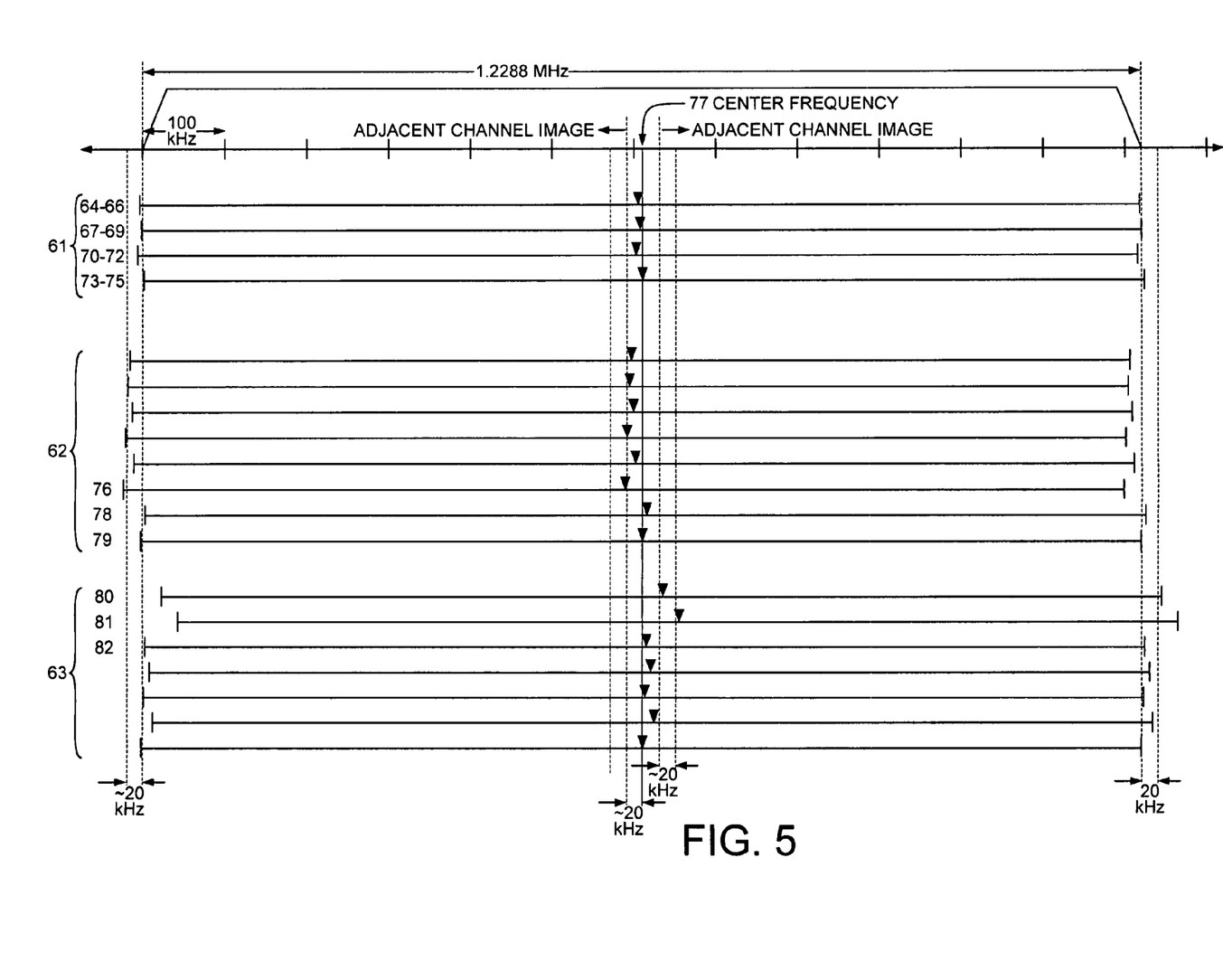
FIG. 5 is a diagram showing the center frequencies of signal bands at which frequency acquisition is attempted.
Figure 6:
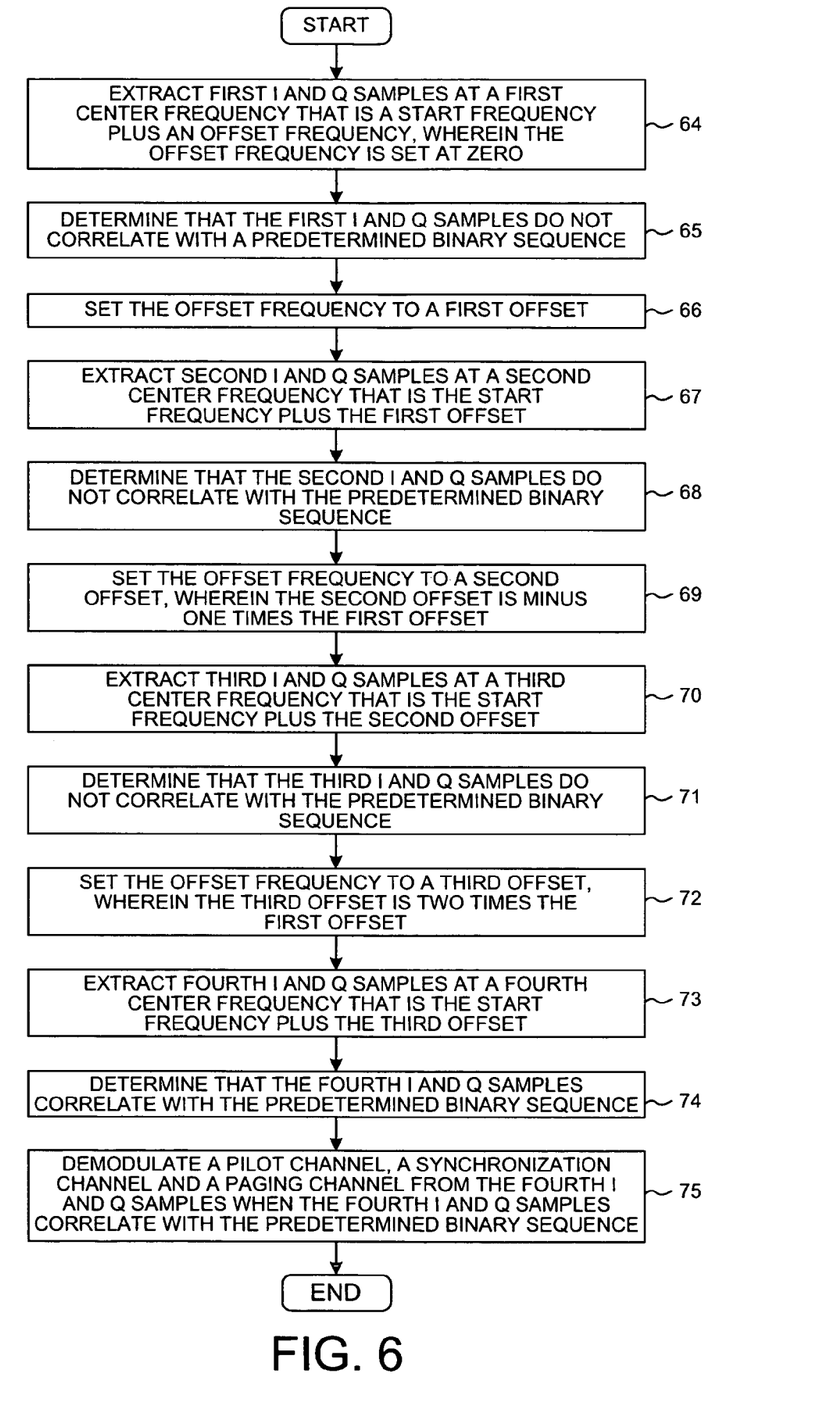
FIG. 6 is a flowchart of steps for stepping the offset frequency used in the frequency acquisition in FIG. 5.

FIG. 5 illustrates the center frequencies at which frequency acquisition is attempted in three hypothetical search runs 61-63. FIG. 6 is a flowchart of steps 64-75 for stepping the offset frequency in step 54 of FIG. 3 to perform a "spiral search." In one embodiment, a software stack running on processor 28 performs the stepping method of FIG. 6. Steps 64 through 73 are performed in hypothetical search run 61 of FIG. 5. Search run 61 begins with step 64 when first I and Q samples are extracted at a first center frequency. The first center frequency is the start frequency plus the offset frequency, which is set at zero. After circuitry 10 determines that the first I and Q samples do not correlate with a predetermined PN sequence in step 65, circuitry 10 sets the offset frequency to a first offset in step 66. In step 67, second I and Q samples are extracted at a second center frequency that is the start frequency plus the first offset frequency set in step 66. After circuitry 10 determines that the second I and Q samples do not correlate with the predetermined PN sequence in step 68, circuitry 10 sets the offset frequency to a second offset in step 69. The second offset is minus one times the first offset. In step 70, third I and Q samples are extracted at a third center frequency that is the start frequency plus the second offset frequency set in step 69. In step 71, it is determined that the third I and Q samples do not correlate with the predetermined PN sequence, and the offset frequency is set to a third offset in step 72. The third offset is two times the first offset. In step 73, fourth I and Q samples are extracted at a fourth center frequency that is the start frequency plus the third offset frequency set in step 72. In step 74, circuitry 10 determines that the fourth I and Q samples correlate with the predetermined PN sequence. In step 75, circuitry 10 demodulates the pilot channel, the synchronization channel and the paging channel from the fourth I and Q samples.

Search run 62 of FIG. 5 illustrates the stepping of the offset frequency in a spiral search that ultimately acquires a synchronization channel with an unexpected SID or NID. I and Q samples in a frequency band 76 are centered at a center frequency that is more than 20 kHz from the correct center frequency 77. After an unexpected SID or NIC is detected, circuitry 10 searches for the pilot channel in a band of I and Q samples 78 with a center frequency that has been bumped by more than fifteen kHz. When the pilot channel is not acquired from band 78, with an offset frequency that has been bumped, the pilot channel is ultimately acquired from a band 79 whose center frequency has been stepped from the bumped frequency. Search run 62 also illustrates that the first step of the offset frequency can be a negative frequency value.

Search run 63 begins at a center frequency that is sufficiently removed from correct center frequency 77 so as to acquire an adjacent channel image. Frequency acquisition at a center frequency that is as little as 20 kHz off the correct center frequency of a 1.2288 MHz-wide CDMA communication channel can result in the acquisition of an image from the adjacent 1.2288 MHz-wide CDMA communication channel. Such adjacent channel acquisition can occur, for example, where the signal strength of an adjacent channel is more than 60 dB stronger than that of the channel that is to be acquired. At the center frequency of a band 80, the pilot channel and the synchronization channel of the adjacent communication channel are acquired. When an unexpected SID of a different CDMA cellular system is detected, circuitry 10 bumps the offset frequency. At the bumped center frequency of band 81, an incorrect SID is still detected. Therefore, circuitry 10 bumps the center frequency again, where the second bump offset is minus one times the first bump offset. Beginning at the second bumped center frequency of a band 82, a spiral search is performed by stepping the offset frequency until pilot, synchronization and paging channels are acquired.

Figure 7:
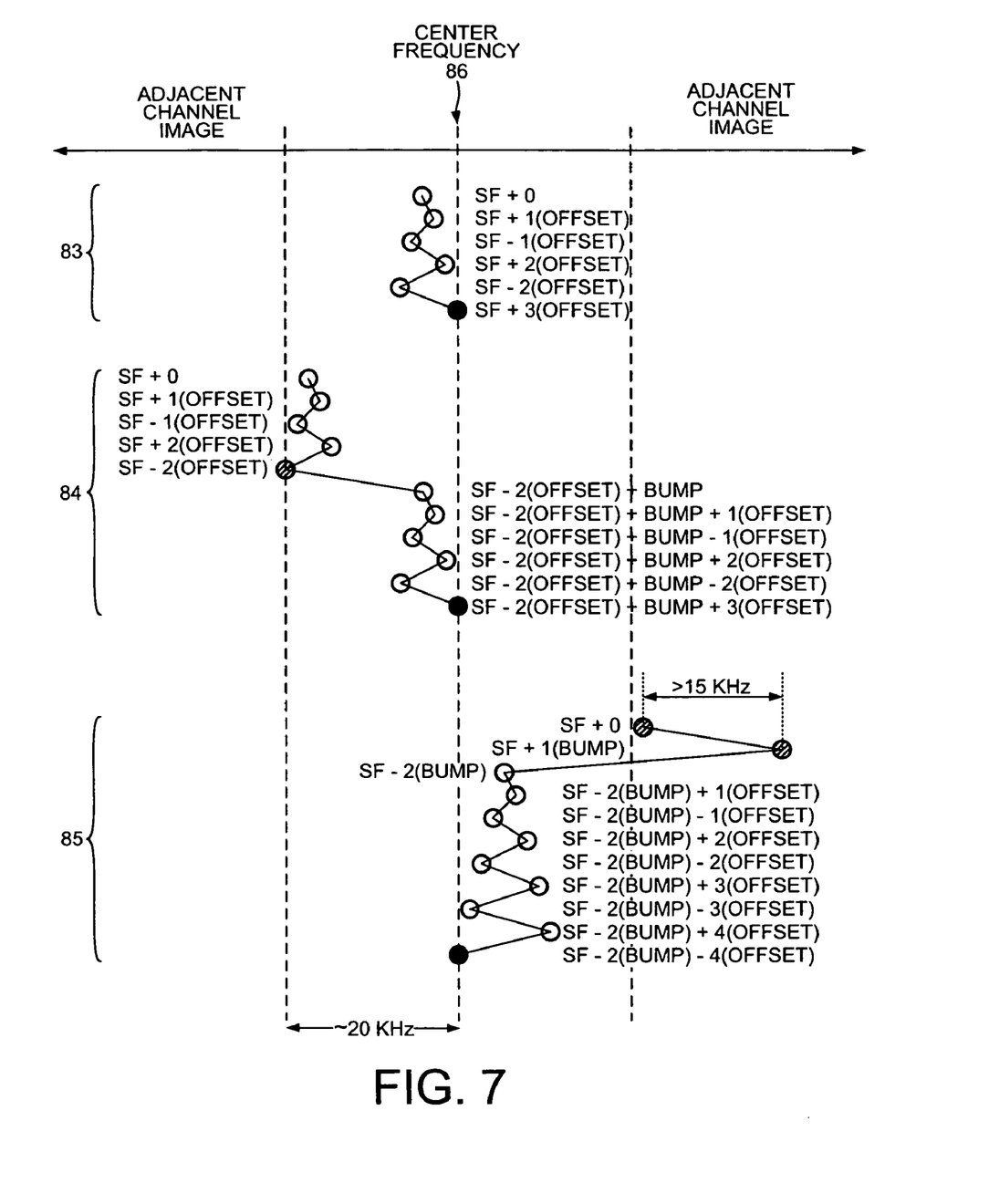
FIG. 7 is a diagram showing the center frequencies at which frequency acquisition is attempted over a larger frequency scale than shown in FIG. 5.

FIG. 7 illustrates the center frequencies at which frequency acquisition is attempted over a larger frequency scale than shown in FIG. 5. Three additional hypothetical search runs 83-85 are shown in which code channels are ultimately acquired at a center frequency 86. FIG. 7 specifies the various values of the center frequency at which frequency acquisition is attempted, where SF denotes the start frequency, OFFSET denotes the offset and BUMP denotes the bump offset. The hashed circles denote center frequencies at which an adjacent channel image is acquired and an unexpected SID or NID is detected.

In one embodiment, the methods for acquiring code channels and for performing a spiral search are carried out in a digital processing apparatus, such as processor 28, that performs a sequence of instructions corresponding to the steps shown in FIG. 3 and in FIG. 6, respectively. In one embodiment, these instructions reside in logic structures on a data storage medium, such as non-volatile memory 27. Non-volatile memory 27 is a processor-readable medium, such as random access memory (RAM). Processor 28 reads the instructions from non-volatile memory before performing the instructions. Alternatively, the instructions can be embodied in the form of computer program code elements on semiconductor devices or other appropriate data storage devices. In that case, the instructions are embodied as a hardware portion of processor 28.

Although the present invention has been described in connection with certain specific embodiments for instructional purposes, the present invention is not limited thereto. Although certain components of circuitry 10, such as frequency rotator 37, are described above as part of digital mobile station modem 29, those components can be part of RF analog chip 30. Conversely, the invention can be practiced where components of RF analog chip 30 are incorporated into digital mobile station modem 29. Although circuitry 10 uses both a PLL and a frequency rotator to shift center frequency, the methods of FIG. 3 and FIG. 6 can also be practiced with only a PLL or a frequency rotator. Particular Walsh functions are described above as being assigned to various code channels. Frequency acquisition using the method described above can be performed regardless of the particular orthogonal code assigned to a specific code channel.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Accordingly, the present invention is not intended to be limited to the embodiments shown herein but is to be accorded the widest scope consistent with the principles and novel features disclosed herein.

What is claimed is:

1. A method for calibrating the frequency of a crystal oscillator based on empirically collected data associated with successful past acquisitions of channels in a CDMA cellular system, comprising:

(a) attempting to acquire a first pilot channel at a first center frequency using the crystal oscillator, wherein the first center frequency substantially equals a first start frequency plus an offset frequency initially set at zero;

(b) verifying acquisition of the first pilot channel at the first center frequency, wherein if the first pilot channel has not been acquired:

iteratively adjusting the first center frequency to a next first center frequency that is equal to the start frequency plus a next offset frequency that is a multiple of a spiral sequence +1, −1, +2, −2, +3, −3, . . . ; and reattempting to acquire the first pilot channel at the next first center frequency until the first pilot channel is acquired at an iteratively adjusted next first center frequency or a predetermined maximum number of iterations has occurred;

(c) attempting to acquire a synchronization channel;

(d) verifying acquisition of the synchronization channel, wherein, if the synchronization channel has not been acquired, steps (a) through (c) are repeated;

(e) attempting to acquire a paging channel;

(f) verifying acquisition of the paging channel, wherein, if the paging channel has not been acquired, steps (a) through (e) are repeated;

(g) determining a first temperature associated with the crystal oscillator;

(h) generating a data set that includes a first data point which correlates the first temperature with the offset of the first center frequency at which the first pilot, synchronization and paging channels were acquired;

(i) attempting to acquire a subsequent pilot channel at a subsequent center frequency using the crystal oscillator, wherein the subsequent center frequency equals a subsequent start frequency plus a subsequent offset frequency initially set at zero and the subsequent start frequency is selected by:

shifting an ideal curve associated with the crystal oscillator such that it overlaps the first data point;

determining a subsequent temperature associated with the crystal oscillator;

identifying a subsequent offset which correlates to the determined subsequent temperature in the shifted ideal curve; and adding the identified subsequent offset to the first start frequency;

(j) repeating steps (b) through (f) for iteration and determination of a final offset that is added to the first start frequency in order to acquire the subsequent pilot channel;

(k) updating the data set to include a subsequent data point which correlates the subsequent temperature with the final offset included in the subsequent center frequency;

(l) attempting to acquire a next subsequent pilot channel at a next subsequent center frequency using the crystal oscillator, wherein the next subsequent center frequency equals a next subsequent start frequency plus a next subsequent offset frequency initially set at zero and the next subsequent frequency is selected by:

fitting an ideal curve associated with the crystal oscillator to the updated data set;

determining a next subsequent temperature associated with the crystal oscillator;

identifying a next subsequent offset which correlates to the determined next subsequent temperature in the fitted ideal curve; and adding the identified next subsequent offset to the first start frequency;

(m) repeating steps (b) through (f) for iteration and determination of a next final offset that is added to the first start frequency in order to acquire the next subsequent pilot channel; and (n) updating the data set to include a next subsequent data point which correlates the next subsequent temperature with the next final offset included in the next subsequent center frequency, wherein subsequent repeats of steps (l) through (n) serve to generate an empirical data set that is uniquely associated with the crystal oscillator and substantially represents the actual temperature compensation required to calibrate the frequency of the crystal oscillator.

2. The method of claim 1, wherein the pilot channels are acquired after I and Q samples which correlate with a predetermined binary pseudo noise sequence are demodulated.

3. The method of claim 1, wherein a synchronization channel contains a system identification, the method further comprising:

determining that the system identification does not identify the CDMA cellular system;

setting a first offset frequency to a second offset frequency, wherein the second offset frequency equals the first offset frequency plus a bump offset, wherein the bump offset is more than fifteen kilohertz; and reattempting to acquire the pilot channel at a center frequency that includes a start frequency plus the bump offset.

4. The method of claim 1, wherein a synchronization channel contains a system identification, further comprising:

determining that the system identification identifies the CDMA cellular system.

5. The method of claim 1, wherein the attempting to acquire a subsequent pilot channel at a subsequent frequency in steps (i) and (l) is performed using a frequency rotator.

6. The method of claim 1, wherein the CDMA cellular system supports a technical standard taken from the group consisting of: IS-95, 1xEV-DO, UMTS, and IS-2000.

7. The method of claim 1, wherein the crystal oscillator has a frequency error greater than ±5 ppm.

8. A method for calibrating the frequency of a crystal oscillator based on empirically collected data associated with successful past frequency acquisitions in a CDMA cellular system, comprising:

(a) extracting first I and Q samples having a first center frequency using the crystal oscillator, wherein the first center frequency is equal to a start frequency plus a first offset frequency set at zero and the start frequency varies with a temperature associate with the crystal oscillator;

(b) determining a start frequency based on a model of an ideal curve associated with the crystal oscillator, wherein the ideal curve maps theoretical frequency errors to associated temperatures and is manipulated to fit a data set of temperature/frequency error data points empirically collected from past performance of the crystal oscillator;

(c) updating the data set using frequency measurements corresponding to a prior acquisition of a pilot channel, a synchronization channel and a paging channel at a measurement temperature;

(d) determining that the first I and Q samples do not correlate with a predetermined binary sequence;

(e) setting the first offset frequency to a next offset frequency wherein the next offset frequency is a multiple of a spiral sequence +1, −1, +2, −2, +3, −3, . . . ;

(f) extracting second I and Q samples having a next center frequency, wherein the next center frequency is the start frequency plus the first offset frequency as set in (e), and repeating steps (d) through (f) using another next offset frequency and a corresponding another next center frequency until the second I and Q samples at the another next center frequency correlate with the predetermined binary sequence or a predetermined maximum number of iterations has occurred;

(g) determining that the second I and Q samples correlate with the predetermined binary sequence, wherein the second I and Q samples contain a synchronization channel message;

(h) determining that the synchronization message does not identify the CDMA cellular system; and (i) bumping the offset first offset frequency to the first offset frequency as set in (e) plus a bump offset, wherein the bump offset is more than fifteen kilohertz, and repeating steps (d) through (g) until the synchronization channel message identifies the CDMA cellular system.

9. The method of claim 8, further comprising:
demodulating a pilot channel, a synchronization channel and a paging channel from the second I and Q samples when the second I and Q sample correlate with the predetermined binary sequence.

10. The method of claim 8, wherein the predetermined binary sequence is a pseudo noise sequence.

11. The method of claim 8, wherein the predetermined binary sequence is a Walsh function.

12. The method of claim 8, wherein the extracting the second I and Q samples in (f) is performed using a frequency rotator.

13. The method of claim 8, wherein the crystal oscillator has a frequency error greater than ±5 ppm.

14. A circuit, comprising:
a demodulator configured to receive I and Q samples using a crystal oscillator;
a decoder configured to output frames; and
a processor coupled to the demodulator and the decoder, wherein the processor is configured with processor-executable instructions to perform operations comprising:
(a) extracting from a channel in a CDMA cellular system first I and Q samples having a first center frequency using the crystal oscillator, wherein the first center frequency is equal to a start frequency plus a first offset frequency set at zero and the start frequency varies with a temperature associate with the crystal oscillator;
(b) determining a start frequency based on a model of an ideal curve associated with the crystal oscillator, wherein the ideal curve maps theoretical frequency errors to associated temperatures and is manipulated to fit a data set of temperature/frequency error data points empirically collected from past performance of the crystal oscillator;
(c) updating the data set using frequency measurements corresponding to a prior acquisition of a pilot channel, a synchronization channel and a paging channel at a measurement temperature;
(d) determining that the first I and Q samples do not correlate with a predetermined binary sequence;
(e) setting the first offset frequency to a next offset frequency wherein the next offset frequency is a multiple of a spiral sequence +1, −1, +2, −2, +3, −3, . . . ;
(f) extracting from a channel in a CDMA cellular system second I and Q samples having a next center frequency, wherein the next center frequency is the start frequency plus the first offset frequency as set in (e), and repeating steps (d) through (f) using another next offset frequency and a corresponding another next center frequency until the second I and Q samples at the another next center frequency correlate with the predetermined binary sequence or a predetermined maximum number of iterations has occurred;

(g) determining that the second I and Q samples correlate with the predetermined binary sequence, wherein the second I and Q samples contain a synchronization channel message;

(h) determining that the synchronization message does not identify the CDMA cellular system; and (i) bumping the offset first offset frequency to the first offset frequency as set in (e) plus a bump offset, wherein the bump offset is more than fifteen kilohertz, and repeating steps (d) through (g) until the synchronization channel message identifies the CDMA cellular system.

15. The circuit of claim 14, wherein the demodulator despreads the I and Q samples using a pseudorandom sequence.

16. The circuit of claim 14, further comprising: a frequency rotator coupled to the processor, wherein the processor is configured with processor-executable instructions to perform operations further comprising:
extracting from a channel in a CDMA cellular system second I and Q samples by controlling the operation of the frequency rotator.

17. The circuit of claim 14, wherein the crystal oscillator has a frequency error greater than ±5 ppm.

18. A circuit, comprising:
a crystal oscillator;
means for extracting from a channel in a CDMA cellular system first I and Q samples having a first center frequency using the crystal oscillator, wherein the first center frequency is equal to a start frequency plus a first offset frequency set at zero and the start frequency varies with a temperature associated with the crystal oscillator;
means for determining a start frequency based on a model of an ideal curve associated with the crystal oscillator, wherein the ideal curve maps theoretical frequency errors to associated temperatures and is manipulated to fit a data set of temperature/frequency error data points empirically collected from past performance of the crystal oscillator;
means for updating the data set using frequency measurements corresponding to a prior acquisition of a pilot channel, a synchronization channel and a paging channel at a measurement temperature;
means for determining that the first I and Q samples do not correlate with a predetermined binary sequence;
means for setting the first offset frequency to a next offset frequency wherein the next offset frequency is a multiple of a spiral sequence +1, −1, +2, −2, +3, −3, . . . ;
means for extracting second I and Q samples having a next center frequency, wherein the next center frequency is the start frequency plus the first offset frequency as set by the means for setting the first offset frequency to a next offset frequency, and means for repeating extracting second I and Q samples using another next offset frequency and a corresponding another next center frequency until the second I and Q samples at the another next center frequency correlate with the predetermined binary sequence or a predetermined maximum number of iterations has occurred;

means for determining that the second I and Q samples correlate with the predetermined binary sequence, wherein the second I and Q samples contain a synchronization channel message;

means for determining that the synchronization message does not identify the CDMA cellular system; and means for bumping the first offset frequency to the another next offset frequency as set by the means for setting the first offset frequency to a next offset frequency plus a bump offset, wherein the bump offset is more than fifteen kilohertz, and means for repeating extracting second I and Q samples until the synchronization channel message identifies the CDMA cellular system.

19. The circuit of claim 18, wherein the means for extracting second I and Q samples having a next center frequency includes a frequency rotator.

20. The circuit of claim 18, wherein the crystal oscillator has a frequency error greater than ±5 ppm.

* * * * *